Dec. 30, 1930.　　E. F. W. ALEXANDERSON　　1,787,299
CONTROL SYSTEM
Filed Jan. 15, 1926
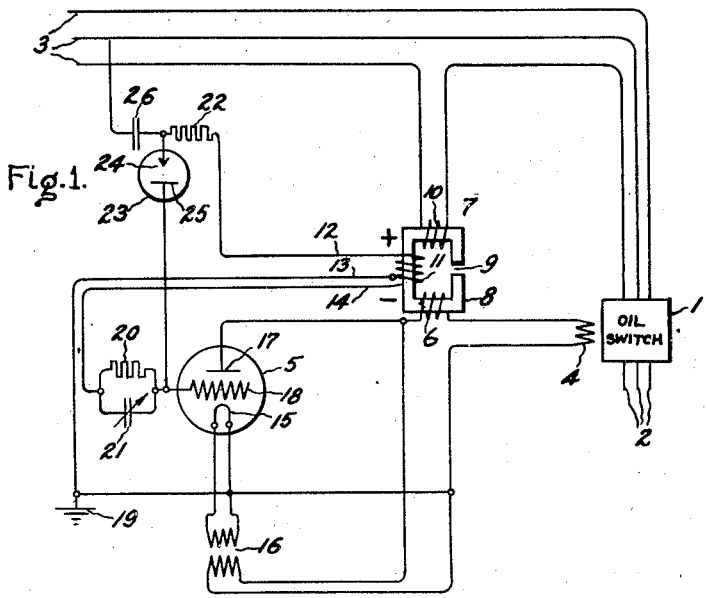
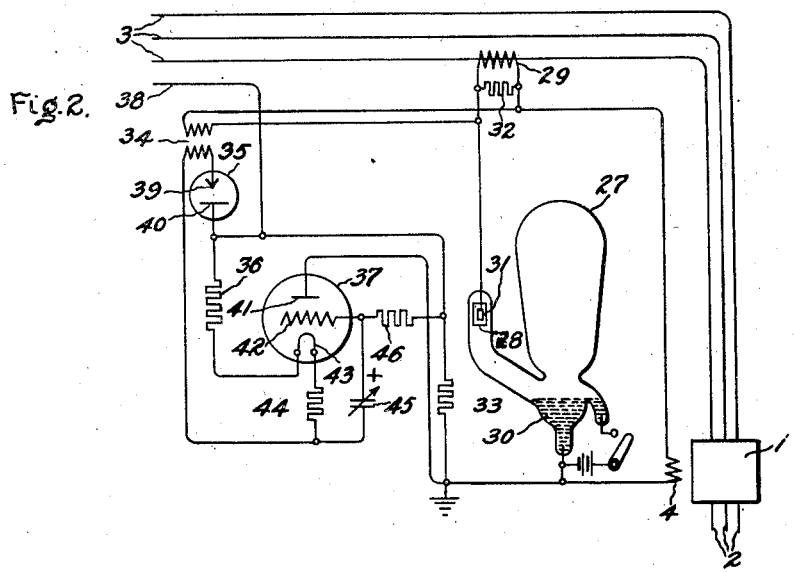
Inventor:
Ernst F. W. Alexanderson,
by
His Attorney.

Patented Dec. 30, 1930

1,787,299

UNITED STATES PATENT OFFICE

ERNST F. W. ALEXANDERSON, OF SCHENECTADY, NEW YORK, ASSIGNOR TO GENERAL ELECTRIC COMPANY, A CORPORATION OF NEW YORK

REISSUED

CONTROL SYSTEM

Application filed January 15, 1926. Serial No. 81,535.

My invention relates to control systems, and has for its principal object the provision of an improved relay apparatus that is simple in construction and is operable after a predetermined time delay to interrupt an electrical circuit when a certain amount of power is transmitted through the circuit in a given direction.

Where power is interchanged between different electrical circuits or systems, it is frequently required that the connections be maintained if current is transmitted between the circuits in one direction and that the systems be disconnected from one another if power exceeding a certain amount is transmitted in the reverse direction between the circuits during a predetermined interval of time. In accordance with my invention, these results are produced by an apparatus comprising electron discharge means operable in response to the voltage and current of a circuit to isolate the circuit when power exceeding a certain amount is transmitted between it and another circuit in a predetermined direction during a given time interval.

My invention will be better understood from the following description when considered in connection with the accompanying drawings and its scope will be pointed out in the appended claims.

Referring to the drawings, Fig. 1 shows a switch control apparatus wherein my invention has been embodied; and Fig. 2 shows a modified embodiment of the invention.

Fig. 1 shows a switch 1 that is connected between two electrical circuits 2 and 3 and is provided with an operating coil 4 connected to an electron discharge device or electrical valve 5 through a secondary circuit 6 of a current transformer 7. The current transformer 7 comprises a core 8 provided with an air gap 9 for limiting its secondary voltage when its secondary circuits are interrupted, a primary circuit 10 which is connected in series with the circuit 3, and a secondary circuit 11 which is provided with terminals 12, 13 and 14. The device 5 comprises a cathode 15 which is supplied with heating current from the secondary circuit 6 through a transformer 16, an anode 17, and a control electrode or grid 18 for controlling the transmission of current between the cathode and anode.

The cathode 15 is grounded at 19 and is connected to the grid 18 through a circuit comprising terminal 13, a part of the secondary winding 11, terminal 14 and a time delay element comprising a resistor 20 and a condenser 21 which are connected in parallel with one another. Through this circuit a negative potential of sufficient magnitude to maintain the valve 5 closed, when the potential of the anode 17 is positive, is applied to the grid 18 so long as the current transmitted through the switch 1 to the circuit 3 does not exceed a predetermined value.

The time delay element comprising resistor 20 and condenser 21 is connected to the secondary winding 11 through terminals 12 and 14, a resistor 22, and a glow discharge device comprising electrodes 24 and 25 which begin to transmit current when they are subjected to a predetermined voltage. The resistor 22 is connected to one conductor of the circuit 3 through capacitance means shown as a condenser 26 and to another conductor of this circuit through the capacitance between this conductor and ground. It should be noted that the electron discharge device preferably contains mercury vapor or the like.

With the connections described, the valve 5 is maintained closed due to the negative bias of the grid 18 so long as the potential applied to the electrodes 24 and 25 is insufficient to initiate the transmission of current through the glow discharge device 23. The voltage applied between the electrodes 24 and 25 is the resultant of two component voltages one of which has its value determined by the voltage of the circuit and the other of which has its value and polarity respectively determined by the magnitude and direction of the current transmitted through the circuit 3. The component voltage that is proportional to the circuit voltage is produced by current transmitted through a circuit comprising the condenser 26, resistor 22, the upper portion of secondary winding 11 and the capacitance between ground and the circuit conductor wherein the primary winding 10 is connected. The component voltage that varies in accordance with the magnitude and direction of the circuit current is produced through the secondary circuit 11.

When current is transmitted from the circuit 3 to the circuit 2, these component voltages tend to neutralize one another, the resultant voltage applied between the electrodes 24 and 25 is insufficient to initiate the transmission of current through device 23, and the valve 18 is maintained closed. When current is transmitted in the opposite direction, the resultant sum of the component voltages is applied to the electrodes 24 and 25. If the current of the circuit 3 exceeds a predetermined value the glow device 23 opens, current is transmitted through a circuit comprising resistor 22, device 23, secondary circuit 11 and the time delay element comprising resistor 20 and condenser 21, thence returning to the device 23. The potential of the grid 18 is changed at a rate determined by the adjustment of the condenser 21 and eventually attains a value at which the valve 18 is opened, and the switch 1 is operated after a time delay dependant on the time required to charge the condenser 21.

The modification shown by Fig. 2 differs from that just described in that the valve 5 is replaced by a mercury arc valve device 27 comprising a grid or control electrode 28 for controlling the current supplied from the current transformer 29 to the switch operating coil 4 through a cathode 30 and an anode 31 of the device 27. A resistor 32 is connected between the secondary terminals of the transformer 29 for preventing an excessive voltage increase when the transformer is not supplying current to the control apparatus.

The grid potential of the device 27 is determined by the voltage drop of a resistor 33 which is connected between the grid 28 and cathode 30, and is connected to the secondary circuit of the current transformer 29 through a potential transformer 34, a glow discharge device 35, a resistor 44 and a vacuum valve device 37, and is connected to one conductor of the circuit 3 through the capacitance between this conductor and the ground and to another of the circuit conductors through a capacitance means 38 shown as a conductor located near the circuit conductor. The glow discharge device includes electrodes 39 and 40. The vacuum device 37 includes an anode 41. It also includes a grid 42 and a cathode 43 which are interconnected through parallel circuits one of which includes a resistor 44 and a condenser 45 for producing a time delay between opening of the valve devices 37 and 27 and the other of which includes a resistor 46 which completes a path for supplying charging current to the condenser 45. With these connections, component voltages dependent respectively on the circuit voltage and on the direction and magnitude of the circuit current are applied to the resistor 33.

When current is transmitted from the circuit 3 to the circuit 2, these component voltages tend to neutralize one another and the potential applied to the grid 28, while the anode potential is positive, is insufficient to produce opening of the valve 27. The component voltage produced in the resistor 33 by reason of its connection between ground and the capacitance device 38 is insufficient alone to produce opening of the valve 27. When current exceeding a given value is transmitted between the circuits in the opposite direction, however, the voltage applied to the electrodes 39 and 40 is raised to a point at which the device 35 begins to transmit current, heating current is supplied through the device 35 and resistors 36 and 44 to the cathode 43, charging current is supplied to the condenser 45 through a circuit including the resistor 46, the potential of the grid 42 is changed at a rate dependent on the charging rate of the condenser 45, the device 37 is opened, the resultant sum of the component voltages is applied to the resistor 33 and the potential of the grid 28 during the interval that the anode 31 is positively charged is raised to a point at which the device 27 is opened and the operating coil 4 is energized. The time interval between opening of the devices 35 and 37 may be of course determined by adjustment of the condenser 45.

The embodiments of the invention illustrated and described herein have been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States is:

1. The combination of a circuit, an electrical valve including a grid for controlling the transmission of current between its cathode and anode, means for producing component voltages respectively proportional to the voltage and current of said circuit, a circuit to which said voltages are applied and voltage responsive means in said voltage circuit operable to change the potential of said grid only when the resultant sum of said component voltages exceeds a predetermined value.

2. The combination of a circuit, an electrical valve including a grid for controlling the transmission of current between its cathode and anode, means for producing component voltages respectively proportional to the voltage and current of said circuit, a circuit to which said voltages are applied, and voltage responsive means connected between said grid and said voltage circuit for causing said valve to be opened only when the resultant sum of said component voltages has been maintained above a predetermined value for a definite interval of time.

3. The combination of a circuit, an electrical valve including a grid for controlling the transmission of current between its cathode and anode, means for producing component voltages respectively proportional to the voltage and current of said circuit, a circuit to which said voltages are applied, a circuit connected between said cathode and grid for applying a negative bias potential to said grid, a time delay element connected in the circuit of said grid, and voltage responsive means in said voltage circuit operable to apply a positive potential to said grid through said time delay element only when the resultant sum of said component voltages exceeds a predetermined value.

4. The combination of a circuit, an electrical valve including a grid for controlling the transmission of current between its cathode and anode, means for producing component voltages respectively proportional to the voltage and current of said circuit, a circuit to which said voltages are applied, a time delay element connected between said grid and cathode, and voltage responsive means connected between said element and said voltage circuit for changing the potential of said grid when the resultant sum of said voltages exceeds a predetermined value.

5. The combination of a circuit, an electrical valve including a grid for controlling the transmission of current between its cathode and anode, means for producing component voltages respectively proportional to the voltage and current of said circuit, a time delay element comprising a resistor and condenser connected in parallel between said cathode and grid, and a circuit comprising a glow discharge device connected between said voltage producing means and said element for changing the potential of said grid at a rate dependent on the capacity of said condenser.

6. The combination of an electron discharge device including a grid for controlling the transmission of current between its cathode and anode, negative bias means connected between said grid and cathode, a time delay element comprising a resistor and a condenser connected in parallel between said cathode and grid, and means including a glow discharge device for applying to said grid a positive potential which increases at a rate dependent on the capacity of said condenser.

7. The combination of an electron discharge device including a grid for controlling the transmission of current between its cathode and anode, negative bias means connected between said grid and cathode, a time delay element comprising a resistor and a condenser connected in parallel between said cathode and grid, and means operable only in response to a voltage exceeding a predetermined value for applying to said grid a positive potential which changes at a rate dependent on the capacity of said condenser.

8. The combination of a plurality of circuits, means for interconnecting said circuits, an electric valve including a cathode and anode connected to said interconnecting means and a grid for controlling the transmission of current between said cathode and anode, and voltage responsive means connected between said cathode and grid for causing said valve to be opened only when power of a predetermined value has been transmitted between said circuits during a definite interval of time.

9. The combination of a plurality of circuits, means for interconnecting said circuits, an electric valve including a cathode and anode connected to said interconnecting means and a grid for controlling the transmission of current between said cathode and anode, means for producing component voltages respectively proportional to the voltage and current of one of said circuits, and means connected between said cathode and grid for causing said valve to be opened only when the resultant sum of said component voltages exceeds a predetermined value, said means including a second electric valve responsive to a predetermined voltage to transmit current, and a circuit through which said current and voltage are applied to said valve.

In witness whereof, I have hereunto set my hand this fourteenth day of January, 1926.

ERNST F. W. ALEXANDERSON.